(12) United States Patent
Cattaneo (10) Patent No.: US 11,877,657 B2
(45) Date of Patent: Jan. 23, 2024

(54) SUPPORT DEVICE FOR FURNITURE SHELVES

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 0 days.

(21) Appl. No.: 17/640,818

(22) PCT Filed: Sep. 9, 2020

(86) PCT No.: PCT/IB2020/058361
§ 371 (c)(1),
(2) Date: Mar. 5, 2022

(87) PCT Pub. No.: WO2021/053463
PCT Pub. Date: Mar. 25, 2021

(65) Prior Publication Data
US 2022/0338630 A1 Oct. 27, 2022

(30) Foreign Application Priority Data
Sep. 16, 2019 (IT) .................. 102019000016343

(51) Int. Cl.
*A47B 96/06* (2006.01)
*F16B 12/24* (2006.01)
*F16B 12/26* (2006.01)

(52) U.S. Cl.
CPC ............ *A47B 96/066* (2013.01); *F16B 12/24* (2013.01); *F16B 12/26* (2013.01)

(58) Field of Classification Search
CPC .. F16B 12/20; F16B 12/2009; F16B 12/2027; F16B 12/2036; F16B 12/2072;
(Continued)

(56) References Cited

U.S. PATENT DOCUMENTS 5,667,327 A * 9/1997 Salice ................. F16B 12/2009
403/231
6,986,488 B2 * 1/2006 Migli ...................... F16B 12/24
248/250
(Continued)

FOREIGN PATENT DOCUMENTS

CN 109008350 12/2018
DE 102009060456 A1 * 4/2011 .............. F16B 12/14
(Continued)

*Primary Examiner* — Patrick D Hawn
(74) *Attorney, Agent, or Firm* — Themis Law (57) ABSTRACT

A shelf-supporting device for the reversible connection of a shelf with shoulders of a piece of furniture includes a main body having a movable engagement system, to which a pin is connected. The movable engagement system slides with respect to the main body between a first non-operating position, in which the pin does not protrude from the shelf, and a second operating position, in which the pin protrudes outwardly from a transverse edge of the shelf. The movable engagement system has two distinct parts, coupled together, and the connection between the slide and the pin may be an interference coupling, a shape coupling, or another type of coupling. This shelf-supporting device makes it possible to miniaturize the pin by drastically reducing its diameter, thus improving the aesthetic impact of the housing hole in the shoulders, and may be made modular by using pins of different diameters and materials.

13 Claims, 8 Drawing Sheets

(58) Field of Classification Search
CPC ........ F16B 12/209; F16B 12/24; F16B 12/26; A47B 2230/0033; A47B 96/066
See application file for complete search history.

(56) References Cited

U.S. PATENT DOCUMENTS

| | | | |
|---|---|---|---|
| 10,034,542 B2 * | 7/2018 | Giovannetti | ....... A47B 47/0091 |
| 10,280,960 B2 * | 5/2019 | Giovannetti | ........ F16B 12/2027 |
| 10,655,662 B2 * | 5/2020 | Rovoletto | ............ A47B 96/066 |
| 10,962,037 B2 * | 3/2021 | Cattaneo | ................. F16B 12/10 |
| 2021/0355976 A1 * | 11/2021 | Cattaneo | ............ F16B 12/2063 |
| 2022/0243752 A1 * | 8/2022 | Cattaneo | ................. F16B 12/24 |

FOREIGN PATENT DOCUMENTS

| | | | | |
|---|---|---|---|---|
| EP | 1228721 A1 * | 8/2002 | ........... | A47B 96/066 |
| EP | 2487373 A1 * | 8/2012 | .......... | F16B 12/2063 |
| EP | 2609833 | 7/2013 | | |
| EP | 2609833 A1 * | 7/2013 | ........... | A47B 96/066 |
| EP | 3524831 A1 * | 8/2019 | .......... | F16B 12/2063 |
| GB | 2494462 | 3/2013 | | |
| WO | WO-2018095686 A1 * | 5/2018 | .......... | F16B 12/2027 |
| WO | WO-2021180353 A1 * | 9/2021 | | |
| WO | WO-2021254665 A1 * | 12/2021 | | |

* cited by examiner

SUPPORT DEVICE FOR FURNITURE SHELVES

FIELD OF THE INVENTION

The present invention relates to a perfected supporting device for furniture shelves for the reversible connection of a shelf to opposite shoulders of a piece of furniture.

The device according to the present invention responds to the need, felt in the field, for being able to provide furniture shelves with increasingly miniaturized supporting devices which form a connection with the shoulders of a piece of furniture, so as to minimize the aesthetic impact and even completely disappear from sight when the shelf is assembled.

STATE OF THE ART

Devices of this type are commonly called shelf brackets in the field, and have the function of stably, but removably, supporting and fixing a horizontal element (shelf) of a piece of furniture between two vertical elements commonly called shoulders.

Said shelves and said shoulders are arranged perpendicular to each other.

Shelf brackets of this type are known in the state of the art, and in particular the same Applicant is the holder of Italian patent application Nr. 102019000013428 which illustrates an innovative shelf-supporting device of which the present invention represents an improvement.

More specifically, with reference to FIGS. 1 to 4, this previous patent application in the name of the same applicant illustrates various alternative embodiments of a shelf-supporting device which has a minimal aesthetic impact once assembled in the shelf and allows an easy and rapid assembly and disassembly of the shelf itself with respect to the shoulders of the furniture.

More particularly, and again by way of example with reference to FIGS. 1 to 4, the shelf bracket 10 according to the previous patent application allows the reversible connection of a shelf 100 to the shoulders 200 of a piece of furniture wherein the connection is effected by means of a pin or plug 11 which is part of said shelf-supporting device 10 which is inserted into said shelf 100 and is configured so as to cause said pin or plug 11 to protrude from the edge B of said shelf 100 to enable it to be inserted into a corresponding housing hole 201 formed on the shoulder 200 of the furniture.

Said shelf-supporting device 10 comprises a main body 12 with respect to which movable engagement means 15 are slidingly associated, in turn associated with an engagement pin 11.

As already specified, the device 10 is configured so that it can be inserted within the thickness of a shelf 100 and comprises movable engagement means 15 which slide with respect to the main body 12 along a sliding direction Y between a first non-operating position wherein the engagement pin 11 does not protrude from the transverse edge B of the shelf 100, and a second operating position in which the engagement pin 11 protrudes outwardly from the shelf 100.

Figure 1A:
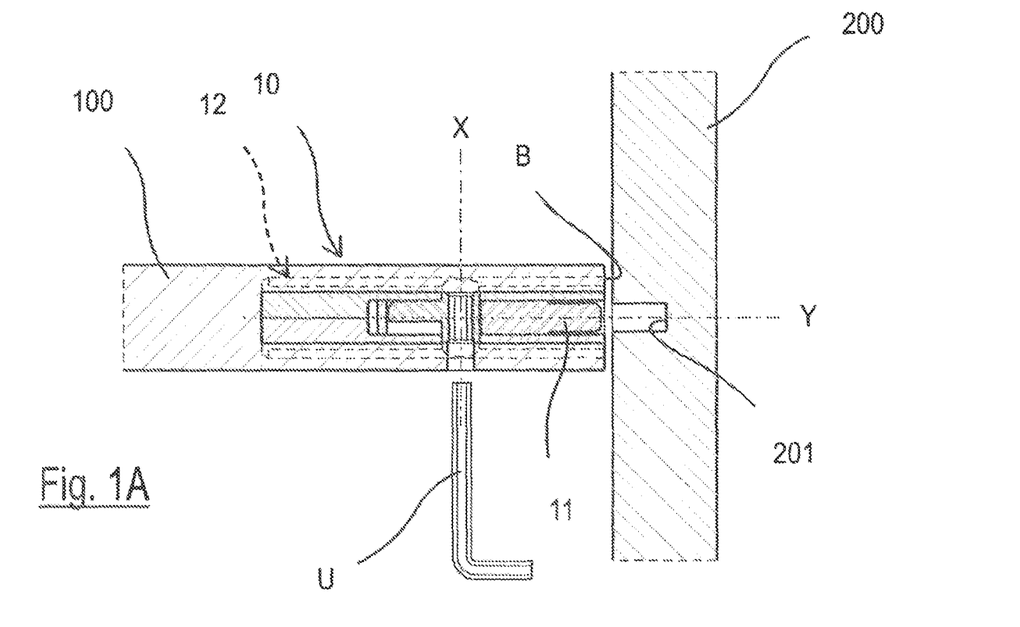
Figure 2A:
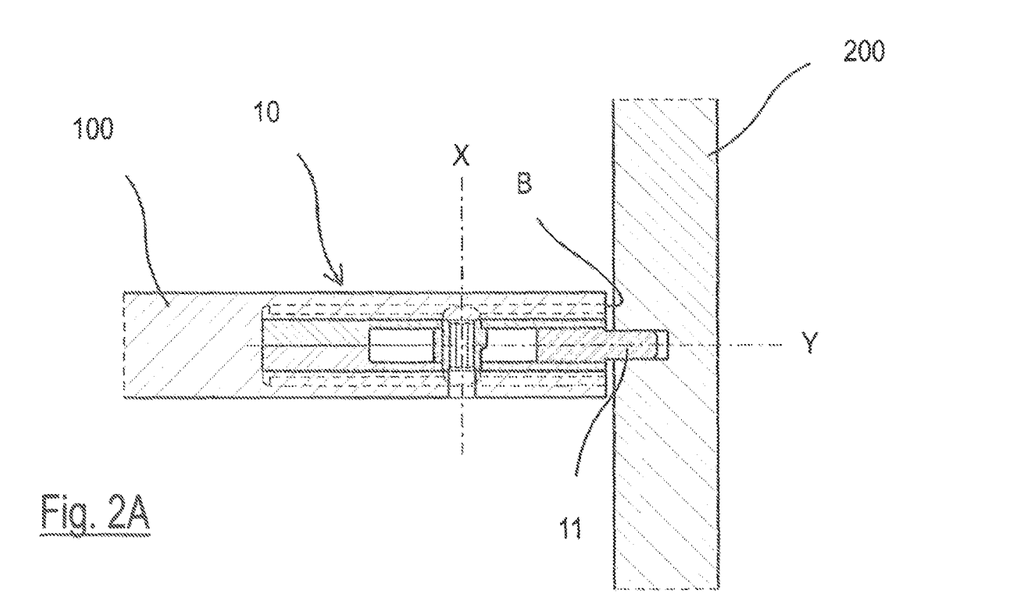
Figure 3:
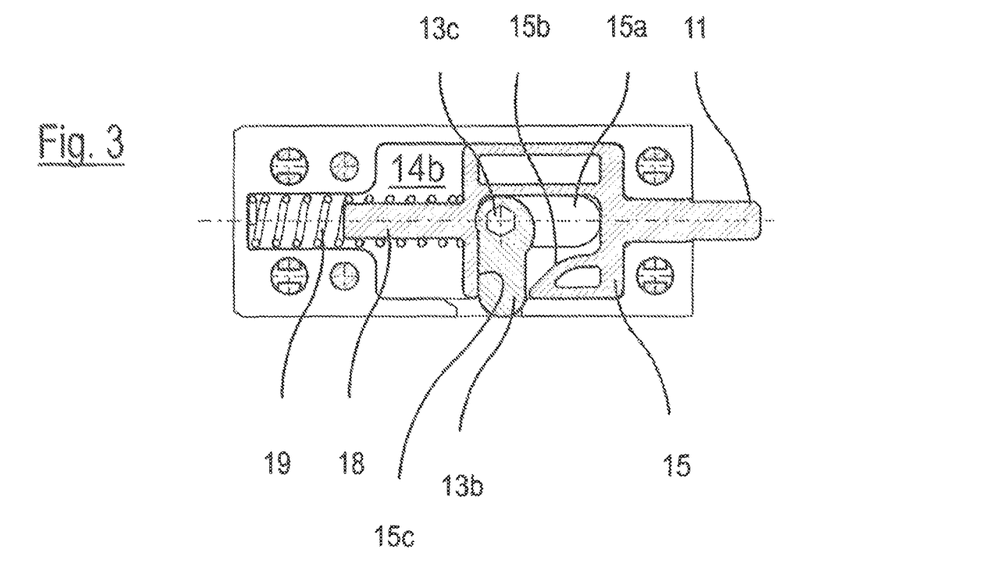
Figure 4:
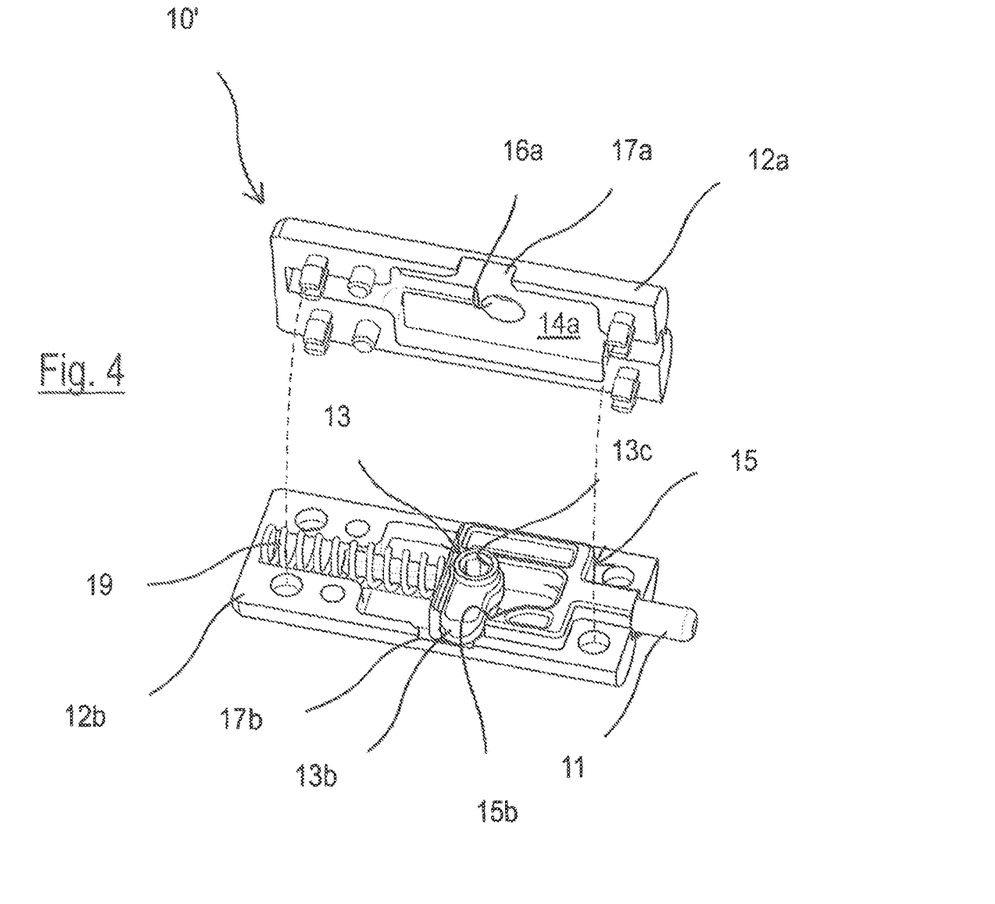

The main body 12 has a box-like shape and is preferably produced by coupling two half-shells, as can be seen for example in FIG. 4.

The shelf bracket 10 comprises actuation means 13 of the engagement means 15 which can be rotated around an axis X substantially orthogonal with respect to the sliding direction Y of said engagement means 15.

The various embodiments shown in Italian patent application Nr. 102019000013428 are alike in the fact that the movable engagement means comprise a slide 15 with which the engagement pin or plug 11 is integrally associated, and are driven in translation by means of motion transmission means which allow the rotational movement around the axis X of actuation means moved by the operator by means of a maneuvering tool U, to be transformed into the translational movement along the direction Y of the slide 15, and therefore the pin 11.

The subsequent Italian patent application Nr. 102019000016247 claiming the internal priority of patent application Nr. 102019000013428 describes further embodiments of the shelf-supporting device of the type described so far wherein the translation actuation of the slide 15 is effected through movable actuation means along the vertical direction X, substantially orthogonal to the advance direction of the slide 15 and the relative pin or plug 11. For this purpose, the slide comprises at least one tilted plane, as described in greater detail in the cited patent application.

The various embodiments of the shelf-supporting device object of the previous patent applications cited above in the name of the same applicant are analogous in the fact that the movable sliding element 15 comprises the pin or plug 11 suitable for being inserted into the hole 201 formed in the shoulder 200 of the piece of furniture with which the shelf 100 must be associated.

More specifically, the pin or plug 11 is generally produced in one piece, by moulding, with the slide 15. The slide 15 and pin 11 can be moulded in materials such as zamak, aluminium or plastic, which makes the production of the shelf bracket easier and inexpensive but which has proved to have various drawbacks.

Among the main drawbacks that affect the shelf bracket of the known type considered so far, the mechanical seal of the shelf bracket itself should be mentioned, and in particular of the pin, that cannot be produced in excessively small diameters, which would cause breakage of the device. In order to ensure the mechanical seal necessary for stably connecting the shelf to the shoulders of the furniture and to enable the shelf to be safely loaded during use, the known solutions in which the slide and pin are produced in one piece, for example in zamak or in plastic, require diameters of the pin not less than 4÷5 mm, which entails the need for producing holes of congruent diameters in the shoulder 200 of the furniture.

Figure 5:
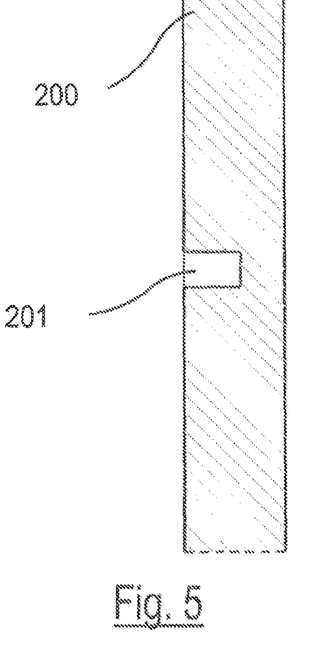
Figure 6:
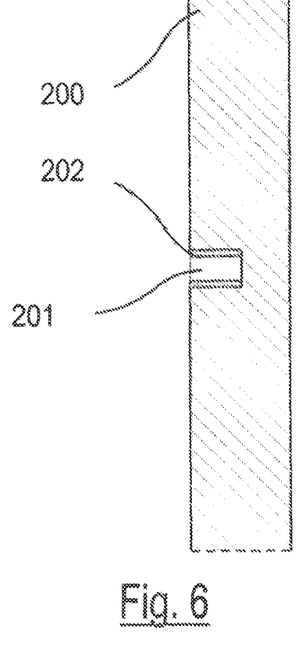
Figure 8:
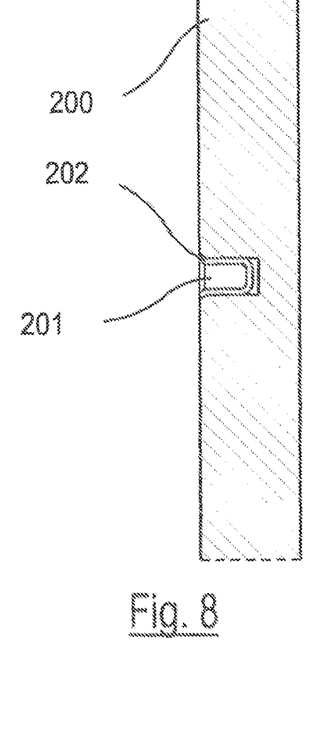

Whether a "bare" hole 201 be provided in the shoulder 200 (FIG. 5), or a turned bush be inserted into the hole 201 (FIG. 6), or a deep-drawn bush be inserted into the hole (FIG. 8) according to expedients that are used in the field for both improving the seal and improving the aesthetics of the hole in the shoulders of the furniture, the diameter of the pin 11 cannot be less than 4÷5 mm.

In some cases, in the field, a bush is inserted into the hole 201 formed in the shoulder 200 of the piece of furniture as this expedient allows not only the aesthetics of the hole to be improved, as it hides the interior of the panel (generally made of chipboard) from the user's view, but also improves the mechanical seal of the shelf bracket as it limits the clearance between the pin 11 and the internal walls of the hole ensuring that the pin itself is aligned with the hole, limiting and guaranteeing greater uniformity of distribution of the shear stress acting on the pin itself.

Figure 7:
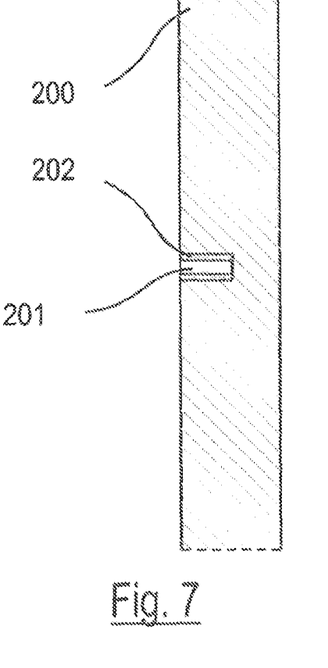
Figure 9:
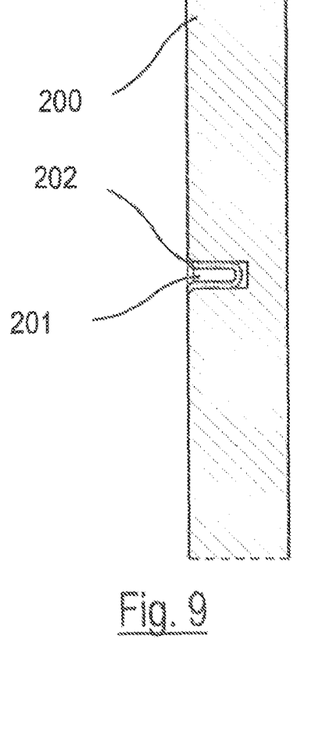

Nevertheless, even a hole equipped with a bush, whether it be turned or deep-drawn, will always have a lesser aesthetic, more pleasant, impact, if it has a small diameter (FIGS. 7 and 9) and said small diameters are, as mentioned, precluded when the pin 11 is made of the same material as the slide 15.

A further drawback that affects known solutions in which the pin is made of a single piece and/or in any case of the same material as the slide, lies in the need for providing a different shelf-supporting device for each diameter of the pin requested by the customer.

This obviously has a considerable impact on the production costs of the shelf bracket and on the management costs of the warehouse, having to create and manage the availability of different shelf-bracket models that could only differ from each other in the diameter of the pin.

SUMMARY OF THE INVENTION

In light of the above, the undertaking of the present invention is to solve the drawbacks affecting supporting devices for shelves, also called shelf-bracket devices, of the type known in the state of the art.

Within this undertaking, the objective of the present invention is to provide a supporting and fixing device for furniture shelves (shelf bracket), which further improves the reduced aesthetic impact of the shelf brackets known from the above-mentioned patent applications in the name of the same applicant, and which allows excellent mechanical resistance while requiring the creation of holes in the shoulder having very small diameters with respect to the diameters used in shelf brackets of the known type, generally not less than 4=5 mm, thus minimizing the aesthetic impact of the hole 201 formed on the shoulder of the furniture.

An objective of the present invention is also to provide a shelf-supporting device that is more versatile so that it can be used with numerous different diameters of holes provided in the shoulders of the piece of furniture, creating in fact a modular system.

The above-mentioned undertaking, as also the objectives indicated above, and others that will appear more evident hereunder, are achieved by a shelf-supporting device for the reversible connection of a shelf to the shoulders of a piece of furniture according to the enclosed claim 1.

Further characteristics of the preferred embodiments of the device according to the present invention described in the present patent application are the subject of the dependent claims.

LIST OF FIGURES

Further characteristics and advantages will appear more evident from the description of a preferred but non-exclusive embodiment of the shelf bracket for the reversible connection of a shelf to the shoulders of a piece of furniture illustrated by way of non-limiting example with the aid of the enclosed drawings in which:

FIGS. 1A to 4 are representative of the shelf-supporting device of the type known from the previous patent applications in the name of the same applicant referred to above;

FIGS. 5 to 9 show possible configurations of the housing hole 201 formed in the shoulder 200 of a piece of furniture;

DETAILED DESCRIPTION OF THE INVENTION

With particular reference to the attached figures from 1 to 4, an example of a shelf-supporting device 10 is illustrated, for the reversible connection of a shelf 100 to opposite shoulders 200 of a piece of furniture, according to what is known from the above-mentioned patent applications in the name of the same applicant.

The supporting device 10 is of the type suitable for creating a connection by means of a pin 11 associated with the shelf 100 and configured for protruding from the transverse edge B of said shelf 100 and suitable for being inserted into a corresponding housing hole 201 formed on the shoulder 200 of a piece of furniture.

The shelf-supporting device 10 comprises a main body 12 with which movable engagement means 15 are slidingly associated, which is produced in a single piece with the pin 11.

The device 10 is configured for being inserted within the thickness of a shelf 100 and said movable engagement means 15 are sliding with respect to the main body 12 along a sliding direction Y between a first non-operating position in which the pin 11 does not protrude from the transverse edge B of the shelf 100, and a second operating position in which the pin 11 protrudes outwardly from the shelf 100.

Said main body 12 is box-shaped and is advantageously produced by the coupling of two half-shells.

The shelf-supporting device 10 comprises actuation means 13 of the engagement means 15 which can be rotated around an axis X substantially orthogonal with respect to the sliding direction Y of said engagement means 15, or, according to alternative embodiments, actuation means of the engagement means 15 movable in the direction X, and further comprises motion transmission means 13b, 15c, 15b suitable for transforming the rotation movement around the rotation axis X of the actuation means 13 into the translational movement along the sliding direction Y of said movable engagement means 15, or it comprises other means, for example the slide 15 can have a tilted plane, suitable for transforming the translation in the direction X of the actuation means into the translational movement along the sliding direction Y of the movable engagement means 15. A helical spring 19 is advantageously provided between the slide 15 and the body 12 in order to push the same slide forwards.

According to the preferred embodiment of the known type illustrated in the attached figures, the movable engagement means 15 comprise a slide 15 which is produced integrally with the pin 11.

The slide 15 advantageously comprises an outlet 15a configured for receiving a cam 13 which comprises a substantially hollow cylindrical central body whose central hole 13c is shaped for receiving a maneuvering tool. The central body can be advantageously shaped so as to have a hole having two different diameters accessible with maneuvering tools having different dimensions.

The functioning of this device is described in detail in the Italian patent applications referred to above in the name of the same applicant.

Figure 10:
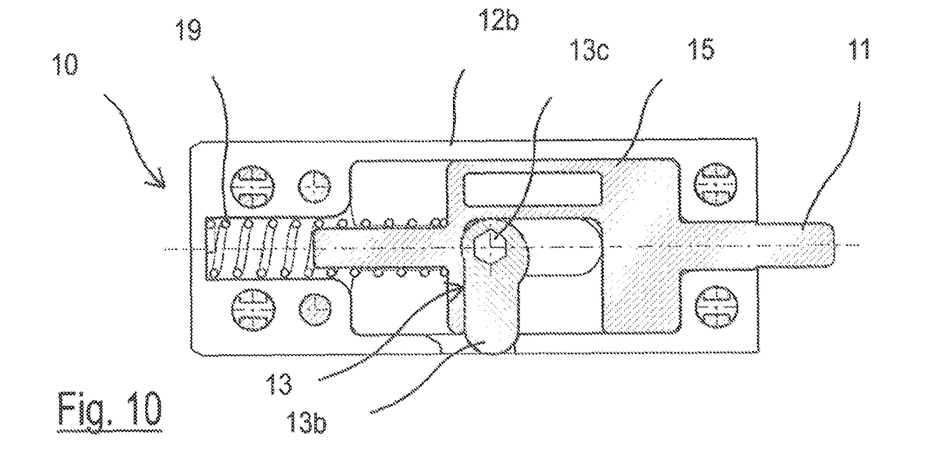
FIGS. 10 and 11 show sectional views from above with a horizontal plane of the shelf-supporting device according to the known art produced with a hole diameter having larger and smaller dimensions respectively, again produced in a single piece with the slide.
Figure 11:
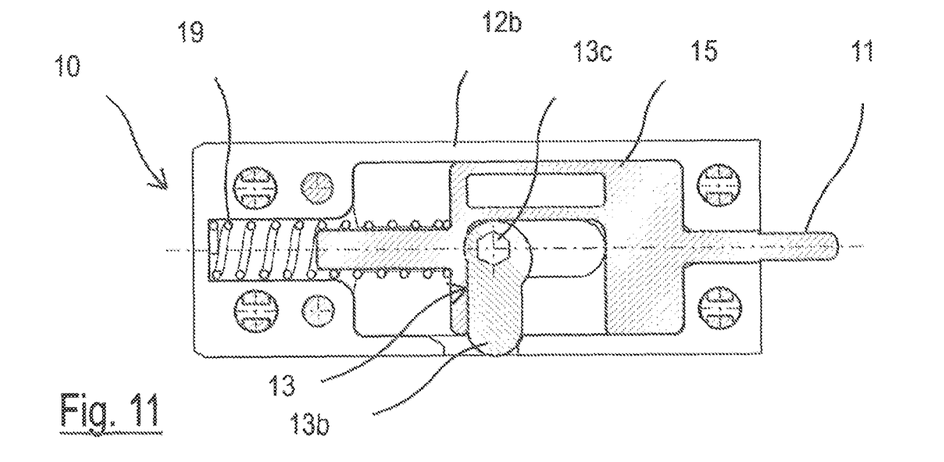

Said shelf-supporting device provides that the slide 15 and the pin 11 are produced integrally, so as to be able to reduce the production costs as the slide assembly with the pin can be produced directly by moulding using low-cost materials such as zamak, aluminium, plastic. With these materials, however, it is not possible to produce a device with a diameter of the pin 11 which is less than 4÷5 mm, as a pin with a smaller diameter made of these materials could break during normal use. FIGS. 10 and 11 illustrate a shelf-supporting device 10 of a known type in which the slide 15 and the pin 11 are produced in a single piece. Whereas FIG. 10 shows a pin whose diameter is about 4÷5 mm and is accepted by the market as it ensures the necessary mechanical resistance, FIG. 11 shows a device whose pin, produced integrally with the slide, has a reduced diameter, i.e. about 2÷3 mm. If the slide and the pin were produced in a single piece in materials such as zamak, aluminium or plastic, this device would not have the necessary mechanical strength and would break during use.

Figure 12:
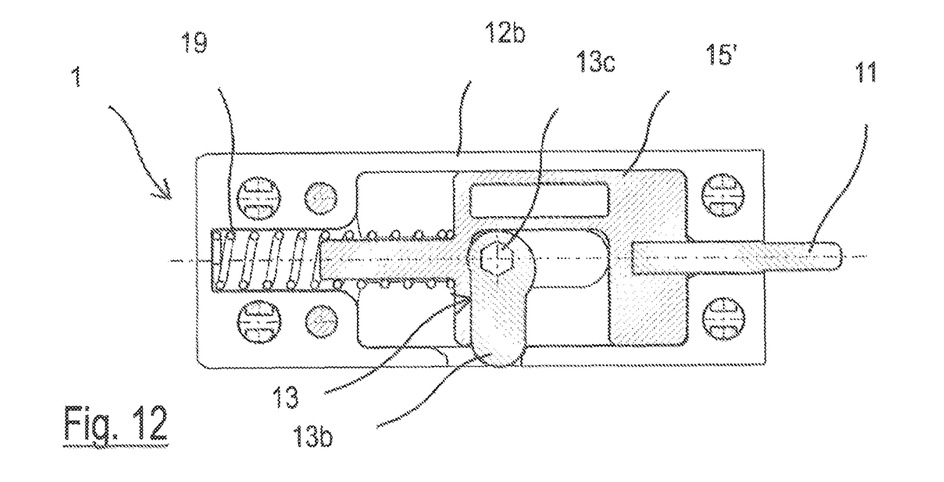
FIG. 12 shows a sectional view from above of a shelf-supporting device according to a first embodiment of the present invention in which the pin and the slide are produced in two distinct parts and coupled together with an interference coupling.

FIG. 12 on the other hand shows a first embodiment of a shelf-supporting device 1 according to the present invention wherein the slide 15' and the pin 11 consist of two distinct elements advantageously joined together through a coupling with interference, i.e. interlocking.

The provision that the slide and pin are distinct elements allows the two elements to be produced in different materials. Thus, for example, the slide 15' can still be made of plastic, zamak or aluminium, whereas the pin 11, which in normal use is destined to be subjected to even very high stress, can be made of a material having higher mechanical characteristics, such as steel.

Figure 13:
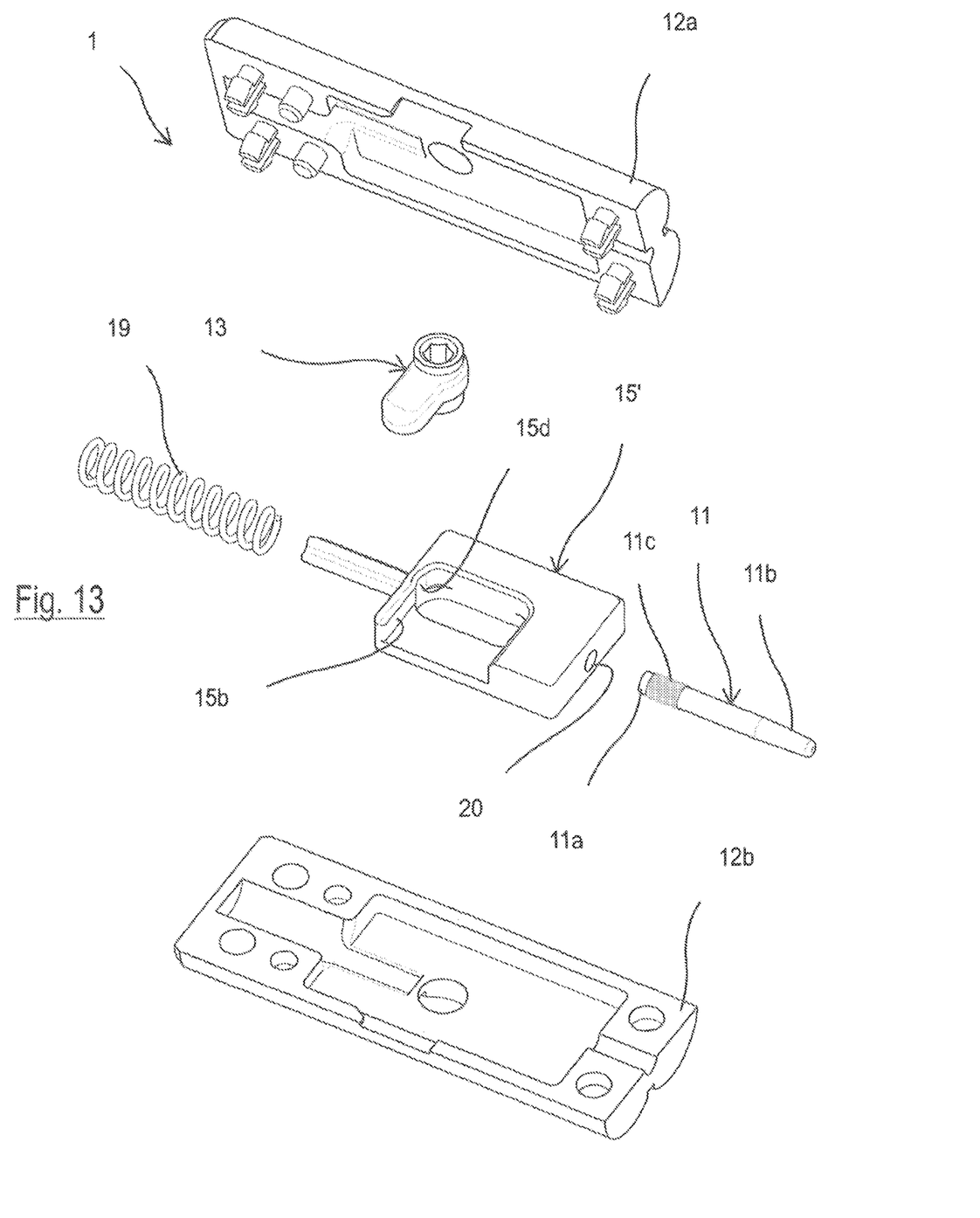
FIG. 13 shows an exploded view of the shelf-supporting device of FIG. 12.

With particular reference to FIG. 13, this is an exploded view of the device 1 of FIG. 11.

The shelf-supporting device 1 for the reversible connection of a shelf to the shoulders of a piece of furniture provides that the connection be effected by means of a pin 11, 11', 11" associated with said shelf 100 and configured so as to protrude from the edge B of said shelf and be inserted into a corresponding housing hole 201 formed on the shoulder 200 of a piece of furniture.

The shelf-supporting device 1 according to the present invention comprises a main body 12 with which movable engagement means 15', 15" are slidingly associated, advantageously consisting of a slide, associated with a pin 11, 11', 11".

The shelf-supporting device 1 is configured for being inserted within the thickness of said shelf 100, and the movable engagement means 15', 15" slide with respect to the main body 12 of the device along a sliding direction Y between a first non-operating position wherein said pin 11, 11', 11" does not protrude from the shelf 100, and a second operating position wherein said pin 11, 11', 11" protrudes outwardly from the shelf 100 so as to be able to be inserted into a housing hole 201 formed on a shoulder 200 of a piece of furniture.

The shelf-supporting device 1 comprises actuation means 13, in the embodiment shown in the figures, consisting of a cam, suitable for actuating the movable engagement means 15', 15", and motion transmission means 13b, 15c, 15b suitable for transforming the movement of said actuation means 13 into a translational movement along the sliding direction Y of the movable engagement means 15', 15".

According to what is already known from the previous patent applications in the name of the same applicant, the shelf-supporting device 1 advantageously further comprises retaining means 15d suitable for keeping the engagement means 15', 15" blocked in said first non-operating position wherein said pin 11, 11', 11" does not protrude from said shelf 100, and furthermore the movable engagement means 15', 15" can be advantageously moved at least in a further third intermediate non-operating and non-blocked position wherein said pin 11, 11', 11" is free to move back until it is completely retracted but wherein said retaining means 15d do not keep said engagement means 15 blocked.

The functionalities of the device 1 are therefore the same as those already described in the previous patent applications cited above, whose contents are referred to herein for reference, whereas the shelf-supporting device 1 according to the present invention is characterized in that the movable engagement means 15', 15" and the pin 11, 11', 11" are produced in two distinct parts, which are coupled together.

With particular reference to the first embodiment of the shelf-supporting device 1 according to the present invention shown in FIGS. 12 and 13, the movable engagement means comprise a slide 15' with which said pin 11 is associated by means of an interference coupling.

The slide 15' advantageously comprises a seat 20 for housing the pin 11 configured for receiving a first end 11a of said pin 11 with an interference coupling, i.e. by interlocking.

Furthermore, on said first end 11a of said pin 11, further interference means are advantageously provided, which are suitable for making the interlocking of said pin 11 more stable within the housing seat 20.

By way of non-limiting example, said interference means can comprise a plurality of radial projections 11c which extend longitudinally for a portion of said first end 11a of said pin 11 destined for being inserted within the housing seat 20.

Figure 14:
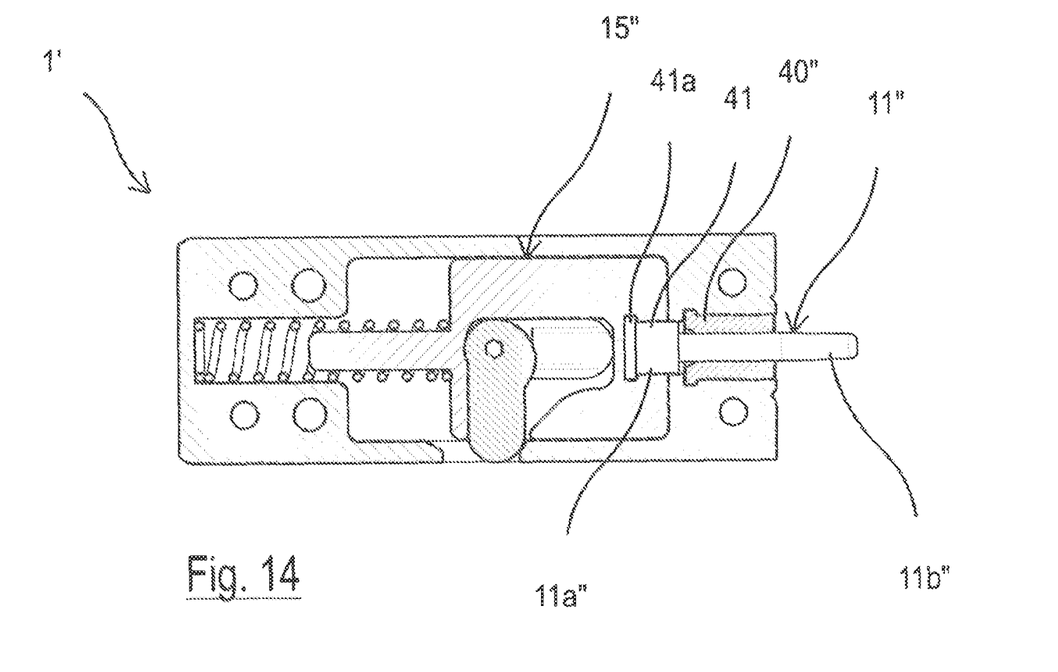
FIGS. 14 and 15 show a sectional view from above of a shelf-supporting device according to a second embodiment of the present invention in which the pin and the slide are produced in two distinct parts and are coupled together with a shape coupling, and which respectively show a pin with a smaller diameter and a pin with a larger diameter associated with the same slide and, thanks to bushes having a different internal diameter, with the same main body of the shelf bracket.
Figure 15:
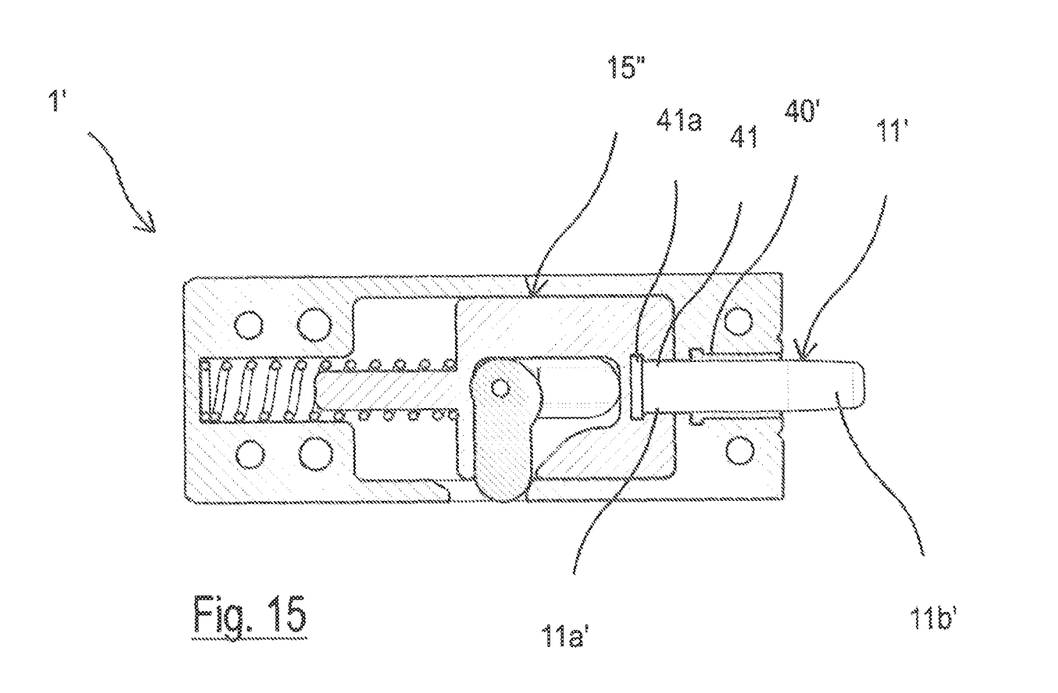
Figure 16:
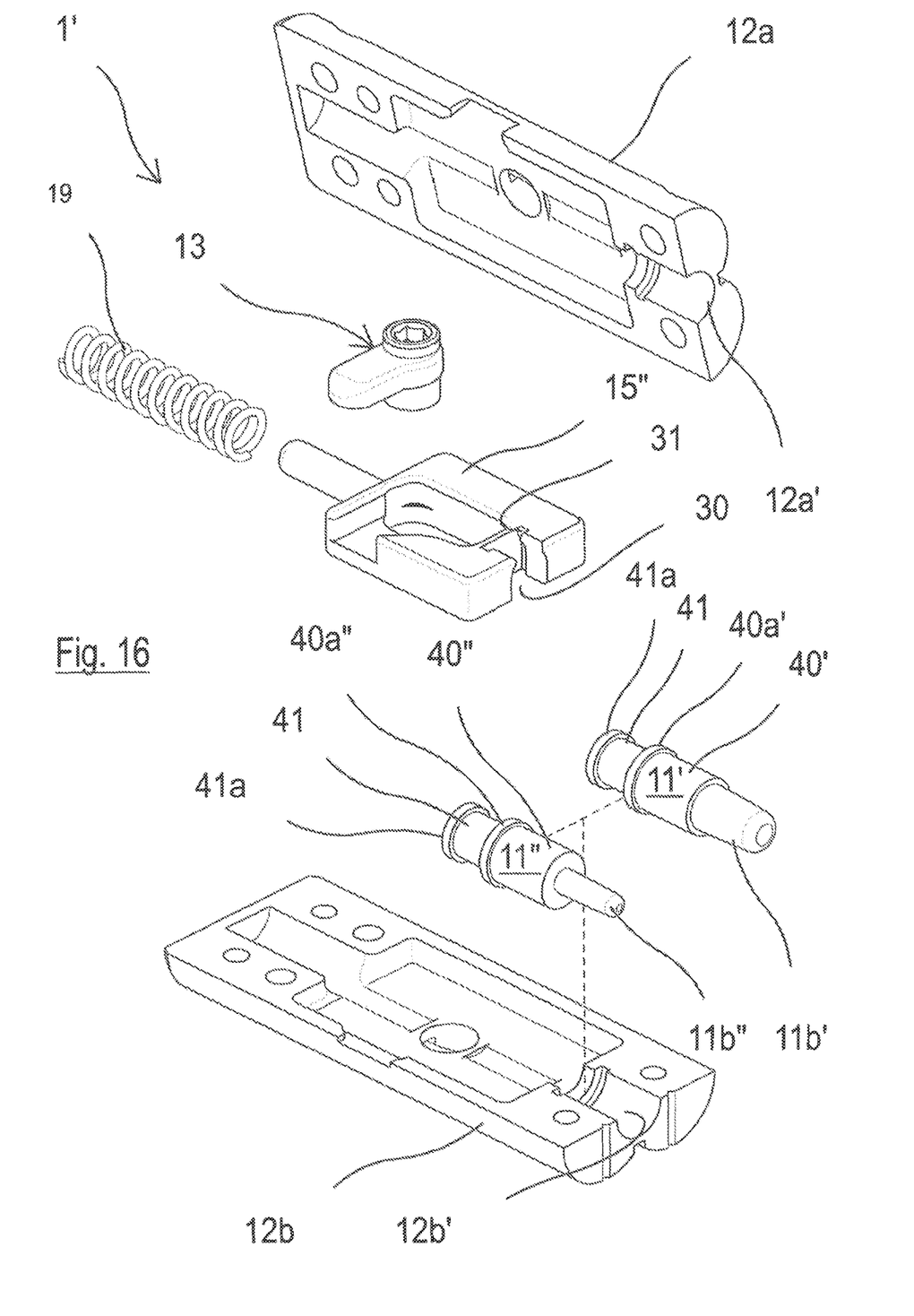
FIG. 16 shows an exploded view of FIGS. 14 and 15.

According to an alternative embodiment shown by way of example in FIGS. 14, 15 and 16, the shelf-supporting device 1' is characterized in that the pin 11', 11" is associated with the movable engagement means, which in the example comprise a slide 15", by means of a shape coupling.

According to this variant, the slide 15' comprises a housing seat 30 for housing the pin 11', 11" which is configured for receiving a first end 11a', 11a" of said pin 11', 11" in shape coupling.

Said first end 11a', 11a" of said pin 11', 11" advantageously comprises a cylindrical portion 41 provided with a collar 41a, and said housing seat 30 of said slide 15" in turn comprises a groove 31 suitable for receiving said collar 41a, thus creating a shape coupling between the slide 15" and the pin 11', 11" suitable for inhibiting the possibility of longitudinal movements of the pin 11', 11" with respect to the slide 15".

When the two half-shells 12a, 12b of the main body 12 are assembled closed on each other, any possibility of relative movement between the pin 11', 11", and in particular between its first end 11a', 11a" comprising the cylindrical shaped portion 41, is prevented.

Even more preferably, the shelf-supporting device 1' according to this embodiment of the present invention can provide that the pin 11', 11" be inserted in a bush 40', 40" configured for being inserted into a corresponding seat 12' formed within said main body 12, in particular a half-seat 12a', 12b' of said seat 12' being formed on each of the two half-shells 12a and 12b of the main body 12.

A plurality of bushes 40', 40", can be advantageously arranged so that each bush has the same external diameter and the same external conformation so that it can be received within the cylindrical seat 12' formed on said main body 12, but different internal diameters, so that a pin with a different diameter can be inserted in each bush.

In the example shown in the figures, the reference is in particular to FIG. 16, a pin 11' having a larger diameter is inserted into a first bush 40', whereas a pin 11" having a larger diameter is inserted into a second bush 40" having the same external diameter and the same external shape as the first bush 40'.

Thanks to the fact that the pin 11', 11" is inserted into a bush 40', 40", the shelf bracket 1' is modular with respect to the possibility of associating pins 11', 11" having different diameters with the same device, and in particular with the same slide 15" and with the same main body 12.

Advantageously, whereas a pin 11, 11' having a reduced diameter of even less than 3 mm, the minimum diameter is deemed to be 2 mm, is in the embodiment with interference coupling of FIGS. 12 and 13, it is preferably made of steel for reasons of sealing, whereas the slide 15', 15" can be made for example of plastic, pins having larger diameters, for example a pin with a diameter of 5 mm, can be made of plastic without risks for the mechanical seal.

The shelf-supporting device 1' according to the embodiment shown in FIGS. 14, 15 and 16 therefore allows, thanks to the bushes having a different internal diameter, pins 11" made of steel having a small diameter or pins having a larger diameter that can be made either of steel or, for example, of plastic or other similar materials, to be indifferently housed.

Figures 17, 18A, 18B:
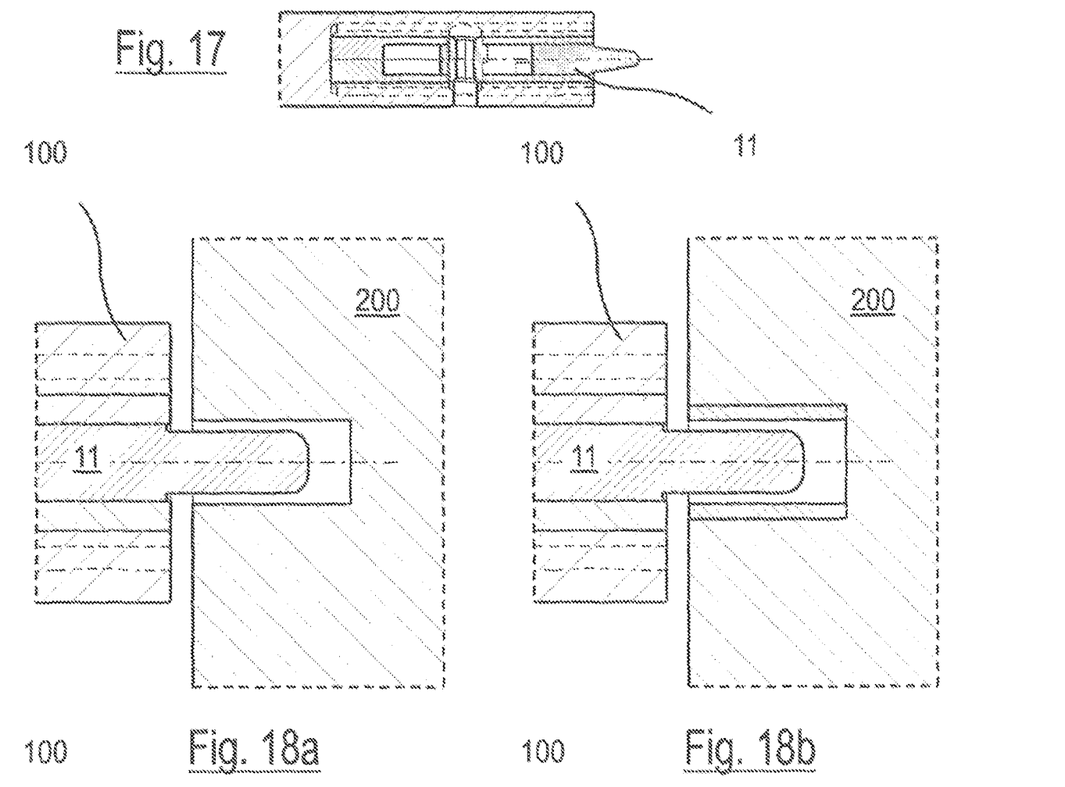
FIG. 17 shows a sectional side view of the shelf-supporting device according to the present invention comprising a pin having the free end suitable for being inserted into the hole produced in the shoulder of the conical-shaped piece of furniture.
FIGS. 18A and 18B show a detail in cross section of a pin having a cylindrical section inserted in a hole without a bush and provided with a bush, respectively.
Figure 19A:
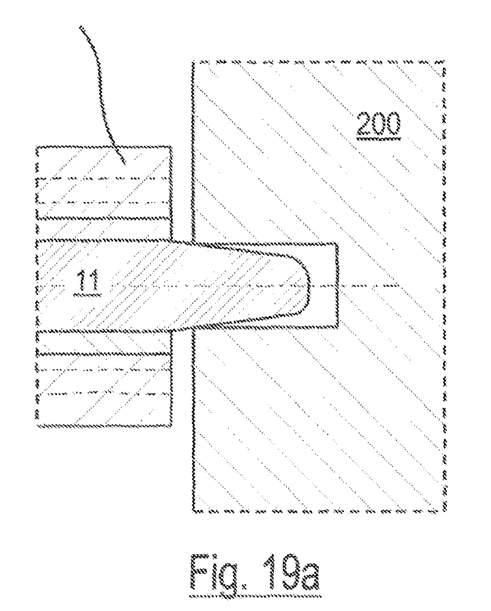
FIGS. 19A and 19B show a detail in cross section of a pin having a cylindrical conical section inserted in a hole, without a bush and provided with a bush, respectively.
Figure 19B:
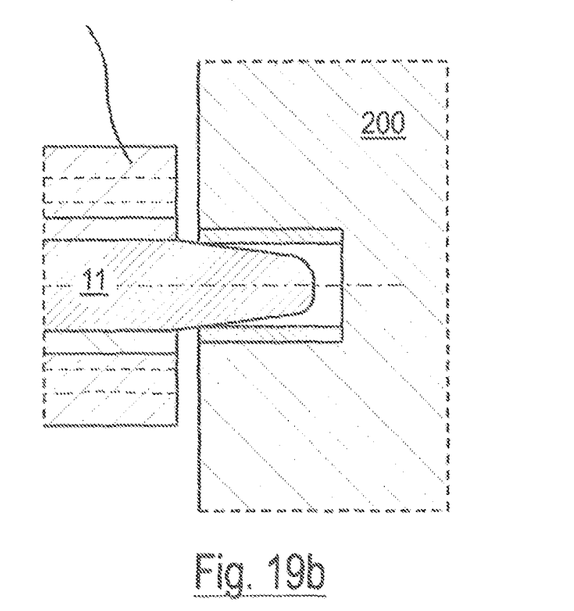

The shelf-supporting device 1, 1' according to the present invention, in all its possible embodiments of which only some examples have been shown herein, can be further improved by providing that the pin 11, 11', 11" has its own free end 11b, 11b', 11b" suitable for being inserted into the hole 201 formed on the shoulder 200 of the piece of furniture, having a conical shape, as shown schematically in FIG. 17 and in FIGS. 19A and 19B.

The conical shape simplifies the operations for inserting the pin 11, 11', 11" into the hole 201 and, as can be seen in particular from the comparison between FIGS. 18A and 18B and FIGS. 19A and 19B, the conical shape also allows the clearance between the pin and the housing hole in the shoulder to be reduced if not cancelled, improving the stability of the coupling of the shelf to the shoulder of the furniture and reducing if not eliminating the possibility of the pin, also due to a greater lever arm, being subjected to bending stress that could compromise its mechanical resistance.

The present invention has been described, for illustrative but non-limiting purposes, with reference to various preferred embodiments. It should be understood however that variations and/or modifications can be applied by a skilled person in the field without thereby departing from the relative protection scope, as defined in the enclosed claims.

The invention claimed is:

1. A shelf-supporting device (1,1') configured to provide a reversible connection of a shelf (100) to a shoulder (200) of a piece of furniture, wherein the connection is effected by a pin (11,11',11") associated with said shelf (100) and arranged so as to protrude from an edge (B) of said shelf and to be inserted into a housing hole (201) formed on said shoulder (200) of said furniture, the shelf-supporting device (1,1') comprising:
a main body (12) housing:
a movable slide (15',15") that is slidingly associated with a pin (11,11',11"), said shelf-supporting device (1,1') being configured to be inserted within a thickness of said shelf (100), said movable slide (15',15") being slidable with respect to said main body (12) along a sliding direction (Y) between a first non-operating position, in which said pin (11,11',11") does not protrude from said shelf (100), and a second operating position, in which said pin protrudes outwardly from said shelf (100);
a spring (19) associated with said movable slide (15', 15") and arranged between said movable slide (15', 15") and said main body (12);
actuation means (13) of said movable slide (15',15"),
wherein said actuation means are coupled to said movable slide so as to transform a movement of said actuation means (13) into a translational movement along the sliding direction (Y) of said movable slide (15',15"), and
wherein said movable slide (15',15") and said pin (11,11', 11") are two distinct parts, coupled with each other.

2. The shelf-supporting device (1) according to claim 1, wherein said movable slide (15'), with which and said pin (11) are coupled by interlocking.

3. The shelf-supporting device (1) according to claim 2, wherein said movable slide (15') comprises a housing seat (20) of the pin (11) configured to interlock a first end (11a) of said pin (11).

4. The shelf-supporting device (1) according to claim 3, further comprising interference means on said first end (11a) of said pin (11) for coupling said pin (11) to said housing seat (20).

5. The shelf-supporting device (1') according to claim 1, wherein said movable slide (15") is associated with said pin (11', 11") by a shape coupling.

6. The shelf-supporting device (1') according to claim 5, wherein said movable slide (15') comprises a housing seat (30) of the pin (11',11") configured for receiving by the shape coupling a first end (41) of said pin (11', 11").

7. The shelf-supporting device (1,1') according to claim 1, wherein said pin (11,11',11") has a free end (11b,11b',11b") configured to be inserted into the housing hole (201) formed on the shoulder (200).

8. The shelf-supporting device (1,1') according to claim 1, wherein said pin (11,11', 11") is made of steel and said slide (15',15") is made of a different material.

9. The shelf-supporting device (1, 1') according to claim 1, wherein said actuation means (13) are rotatable, and wherein said actuation means are coupled to said movable slide so as to transform a rotational movement of said actuation means (13) into a translational movement along the sliding direction (Y) of said movable slide (15',15").

10. A shelf-supporting device (1,1') configured to provide a reversible connection of a shelf (100) to a shoulder (200) of a piece of furniture, wherein the connection is effected by a pin (11,11',11") associated with said shelf (100) and arranged so as to protrude from an edge (B) of said shelf and to be inserted into a housing hole (201) formed on said shoulder (200) of said furniture, the shelf-supporting device (1,1') comprising:

- a main body (12) housing movable engagement means (15',15") that are slidingly associated with a pin (11, 11',11"), said shelf-supporting device (1,1') being configured to be inserted within a thickness of said shelf (100), said movable engagement means (15',15") being slidable with respect to said main body (12) along a sliding direction (Y) between a first non-operating position, in which said pin (11,11',11") does not protrude from said shelf (100), and a second operating position, in which said pin protrudes outwardly from said shelf (100);
- actuation means (13) of said movable engagement means (15',15"); and
- motion transmission means (13b,15c,15b) configured to transform a movement of said actuation means (13) into a translational movement along the sliding direction (Y) of said movable engagement means (15',15"),
- wherein said movable engagement means (15',15") and said pin (11,11',11") are two distinct parts, coupled with each other,
- wherein said movable engagement means comprise a slide (15'), with which said pin (11) is associated via an interference coupling,
- wherein said slide (15') comprises a housing seat (20) of the pin (11) configured to interlock a first end (11a) of said pin (11),
- further comprising interference means on said first end (11a) of said pin (11 for coupling between said pin (11) to said seat (20), and
- wherein said interference means comprise a plurality of radial reliefs which develop longitudinally along a section of said first end (11a) of said pin (11).

11. A shelf-supporting device (1,1') configured to provide a reversible connection of a shelf (100) to a shoulder (200) of a piece of furniture, wherein the connection is effected by a pin (11,11',11") associated with said shelf (100) and arranged so as to protrude from an edge (B) of said shelf and to be inserted into a housing hole (201) formed on said shoulder (200) of said furniture, the shelf-supporting device (1,1') comprising:

- a main body (12) housing movable engagement means (15',15") that are slidingly associated with a pin (11, 11',11"), said shelf-supporting device (1,1') being configured to be inserted within a thickness of said shelf (100), said movable engagement means (15',15") being slidable with respect to said main body (12) along a sliding direction (Y) between a first non-operating position, in which said pin (11,11',11") does not protrude from said shelf (100), and a second operating position, in which said pin protrudes outwardly from said shelf (100);
- actuation means (13) of said movable engagement means (15',15"); and
- motion transmission means (13b,15c,15b) configured to transform a movement of said actuation means (13) into a translational movement along the sliding direction (Y) of said movable engagement means (15',15"),
- wherein said movable engagement means (15',15") and said pin (11,11',11") are two distinct parts, coupled with each other,
- wherein said movable engagement means comprise a slide (15"), with which said pin (11',11") is associated by a shape coupling,
- wherein said slide (15') comprises a housing seat (30) of the pin (11',11") configured for receiving by the shape coupling a first end (41) of said pin (11', 11"), and
- wherein said first end (41) of said pin (11',11") comprises a cylindrical portion (41) provided with a collar (41a) and said housing seat (30) of said slide (15") comprises a groove (31) configured to receive said collar (41a), thus enabling the shape coupling to prevent longitudinal movements of the pin (11',11") with respect to the slide (15").

12. The shelf-supporting device (1) according to claim 11, wherein said pin (11',11") further comprises a bush (40',40") configured to be inserted into a corresponding seat (12') formed in said main body (12).

13. The shelf-supporting device (1) according to the claim 12, wherein said bush (40',40") is produced with an external diameter designed to be received by said corresponding seat (12') formed on said main body (12) and having variable internal diameters, so as to receive a pin (11') having a larger diameter or a pin (11") having a smaller diameter, thus making the shelf supporting device (1) modular so as to associate pins (11', 11") having different diameters with the shelf-supporting device.

* * * * *